United States Patent [19]

Moroishi et al.

[11] Patent Number: 5,766,727
[45] Date of Patent: Jun. 16, 1998

[54] MAGNETIC RECORDING MEDIUM AND METHOD FOR MANUFACTURING THE SAME

[75] Inventors: Keiji Moroishi, Kofu; Kiyoshi Sato; Isao Kawasumi, both of Nirasaki; Hisao Kawai, Yamanashi-ken, all of Japan

[73] Assignee: Hoya Corporation, Tokyo, Japan

[21] Appl. No.: 639,168

[22] Filed: Apr. 26, 1996

[51] Int. Cl.$^6$ .............................. G11B 5/66; C23C 14/00
[52] U.S. Cl. .................. 428/141; 428/336; 428/694 T; 428/694 TS; 428/694 TR; 428/694 TP; 428/900; 204/192.2; 204/192.16
[58] Field of Search .................... 428/336, 141, 428/694 T, 694 TS, 694 TR, 694 TP, 900; 204/192.2, 192.16

[56] References Cited

U.S. PATENT DOCUMENTS

| | | | |
|---|---|---|---|
| 4,835,032 | 5/1989 | Arioka | 428/143 |
| 4,837,116 | 6/1989 | Arioka | 428/141 |
| 5,079,062 | 1/1992 | Masuda | 428/65.3 |
| 5,316,844 | 5/1994 | Suzuki | 428/323 |
| 5,474,830 | 12/1995 | Yamaguchi | 428/141 |

*Primary Examiner*—Leszek Kiliman
*Attorney, Agent, or Firm*—Edward D. Manzo; Mark J. Murphy

[57] ABSTRACT

According to the present invention, a magnetic recording medium comprises a glass substrate, a first under layer, a second under layer, a magnetic layer, a protective layer and a lubricant layer in the named order. The first under layer is formed on a glass plate, a surface of which is highly polished. The second under layer is formed, on the first under layer, of a material differing from a material of the first under layer, and has a thickness greater than a thickness of the first under layer. The magnetic layer is formed on the second under layer. The protective layer is formed on the magnetic layer, on whose surface a texture due to dispersed hard minute particles appears. The lubricant layer is formed on the protective layer. For such a magnetic recording medium, a property of the material used for the first under layer is that it promotes the crystalline growth of the second under layer, which is formed on the first under layer to support the crystalline growth of the magnetic layer that is deposited on the second under layer; and another property is that it relieves internal stress resulting from a difference in thermal expansion between the second under layer and the glass substrate.

14 Claims, 7 Drawing Sheets

FIG. 1

- 5a SILICON OXIDE LAYER
- 5b SILICA MINUTE PARTICLES } 5 PROTECTIVE LAYER
- 6 LUBRICANT LAYER
- 4 MAGNETIC LAYER
- 3 SECOND UNDER LAYER
- 2 FIRST UNDER LAYER
- 1 GLASS SUBSTRATE

FIG. 2

|  | COERCIVE FORCE (Oe) | OUTPUT ($\mu V$) | NOISE ($\mu Vrms$) |
|---|---|---|---|
| 1st EMBODIMENT | 1600 | 240 | 2.1 |
| 1st COMPARISON EXAMPLE | 1400 | 200 | 4.0 |
| 2nd COMPARISON EXAMPLE | 1300 | 190 | 2.1 |
| 3rd COMPARISON EXAMPLE | 1600 | 210 | 3.7 |

| EMBODIMENT | FIRST UNDER LAYER THICKNESS (Å) | COERCIVE FORCE (Oe) | OUTPUT (μV) | NOISE (μVrms) |
|---|---|---|---|---|
| 4 | 10 | 1550 | 210 | 3.0 |
| 5 | 30 | 1600 | 240 | 2.3 |
| 6 | 50 | 1600 | 240 | 2.1 |
| 7 | 100 | 1700 | 245 | 2.9 |
| EMBODIMENT | SECOND UNDER LAYER THICKNESS | | | |
| 8 | 500 | 1550 | 225 | 1.9 |
| 9 | 1000 | 1600 | 240 | 2.1 |
| 10 | 2500 | 1700 | 245 | 3.0 |
| EMBODIMENT | MAGNETIC LAYER THICKNESS | | | |
| 11 | 200 | 1800 | 120 | 1.2 |
| 12 | 350 | 1750 | 180 | 1.6 |
| 13 | 450 | 1650 | 200 | 2.0 |
| 14 | 600 | 1550 | 300 | 2.8 |

FIG. 7

| EMBODIMENT | NON-MAGNETIC INTERMEDIATE LAYER THICKNESS (Å) | COERCIVE FORCE (Oe) | OUTPUT (μV) | NOISE (μVrms) |
|---|---|---|---|---|
| 15 | 10 | 1650 | 225 | 2.8 |
| 16 | 30 | 1700 | 255 | 2.1 |
| 17 | 50 | 1700 | 255 | 1.9 |
| 18 | 100 | 1750 | 200 | 2.0 |

F I G. 8

| EMBODIMENT | FIRST UNDER LAYER | COERCIVE FORCE (Oe) | D50 | NOISE (μVrms) |
|---|---|---|---|---|
| 19 | Si | 1600 | 76 | 2.2 |
| 20 | Pb | 1580 | 73 | 2.4 |
| 21 | Cu | 1650 | 80 | 2.1 |
| 22 | InGa | 1620 | 77 | 2.1 |

F I G. 9

| EMBODIMENT | FIRST UNDER LAYER | COERCIVE FORCE (Oe) | D50 | NOISE (μVrms) |
|---|---|---|---|---|
| 23 | Si | 1650 | 80 | 2.1 |
| 24 | Pb | 1650 | 75 | 2.4 |
| 25 | Cu | 1700 | 83 | 2.0 |
| 26 | InGa | 1680 | 80 | 2.1 |

FIG. 10

| EMBODIMENT | MAGNETIC LAYER MATERIAL | COERCIVE FORCE (Oe) | D50 | OUTPUT ($\mu$Vrms) |
|---|---|---|---|---|
| 27 | CoCrTa | 1650 | 79 | 230 |
| 28 | CoNiCrTa | 1800 | 80 | 245 |
| 29 | CoCrPt | 2100 | 83 | 265 |
| 30 | CoNiPtSi | 2000 | 85 | 250 |
| 31 | CoCrPtB | 2000 | 86 | 255 |
| 32 | CoCrPtZr | 1850 | 77 | 230 |
| 33 | CoNiCrPtB | 1900 | 80 | 250 |

FIG. 11

| EMBODIMENT | MAGNETIC LAYER MATERIAL | COERCIVE FORCE (Oe) | D50 | OUTPUT ($\mu$Vrms) |
|---|---|---|---|---|
| 34 | CoCrTa | 1680 | 79 | 230 |
| 35 | CoNiCrTa | 1850 | 82 | 250 |
| 36 | CoCrPt | 2200 | 87 | 280 |
| 37 | CoNiPtSi | 2200 | 86 | 270 |
| 38 | CoCrPtB | 2100 | 86 | 265 |
| 39 | CoCrPtZr | 1850 | 80 | 240 |
| 40 | CoNiCrPt | 2000 | 84 | 245 |

FIG. 12

| EMBODIMENT | LAYER THICKNESS | LAYER MATERIAL | AVERAGE PARTICLE DIAMETER | CSS | OUTPUT |
|---|---|---|---|---|---|
| 41 | 80 | $ZrO_2$ | 50 | OK | 250 |
| 42 | 130 | SiON | 100 | OK | 240 |
| 43 | 180 | SiC | 120 | OK | 230 |
| 44 | 220 | $SiO_2$ | 150 | OK | 240 |
| 45 | 270 | $ZrO_2$ | 200 | OK | 220 |
| 46 | 290 | $SiO_2$ | 300 | OK | 210 |

FIG. 13

| EMBODIMENT | LAYER THICKNESS | LAYER MATERIAL | AVERAGE PARTICLE DIAMETER | CSS | OUTPUT |
|---|---|---|---|---|---|
| 47 | 90 | $ZrO_2$ | 50 | OK | 255 |
| 48 | 130 | $SiO_2$ | 100 | OK | 250 |
| 49 | 180 | SiC | 120 | OK | 230 |
| 50 | 220 | SiON | 150 | OK | 245 |
| 51 | 280 | $ZrO_2$ | 200 | OK | 230 |
| 52 | 300 | SiN | 300 | OK | 210 |

MAGNETIC RECORDING MEDIUM AND METHOD FOR MANUFACTURING THE SAME

REFERENCE TO RELATED APPLICATION

This application claims the priority rights granted under 35 U.S.C 119 to Japanese Patent Application No. Hei 07-105089, filed Apr. 28, 1995, the entire disclosure of which is incorporated herein by reference.

BACKGROUND OF THE INVENTION

1. Field of the invention

The present invention relates to a magnetic recording medium, or more specifically, to a magnetic recording medium that is effectively applied to a magnetic disk device, and to a method for manufacturing the same.

2. Description of the Related Art

Recently, there has been a greater demand for a magnetic recording medium, such as a hard disk, having an increased recording density.

A common magnetic recording medium, such as a hard disk, is formed of a anion-magnetic substrata overlaid with a under layer, a magnetic film layer, and a protective film layer. A head slider, on which is mounted a magnetic head, flies and travels over the recording medium to write and read data. To realize an increase in the recording density of the magnetic recording medium, it is important not only to provide a magnetic film that has a high magnetic coercive force, but also to provide a head slider that has a low flying height while traveling, and high CSS (Contact Start and Stop) durability. In other words, to enable high density recording and reading, the distance between the magnetic head and the magnetic layer must be decreased when writing and reading by providing for the head to fly at a low flying height. When the head slider slides and flies low and since the physical and mechanical loads applied to the magnetic head and the magnetic recording medium are drastically increased at the travel start and halt, if the sliding and the flying of the head slider are repeatedly switched, the durability (high CSS durability) of both the magnetic head and the magnetic recording medium at CSS must be increased.

Presently, during the fabrication process that is employed for many hard disks, the Ni-P plated surface of an aluminum alloy substrate, which is employed as a non-magnetic substrate, is polished, and an appropriate roughness is provided on the surface by a texturing process. Then a backing film, a magnetic film, a protective film, etc., are deposited in named order by sputtering. That is, the texture due to the surface roughness, which is provided by the texturing process, is reflected via the under layer and the magnetic layer to the surface of the protective layer to prevent the head slider from sticking to the magnetic recording medium at CSS and to maintain a predetermined degree of friction between the head slider and the magnetic recording medium.

It has been found, however, that the usefulness of this method is limited when it is employed to increase magnetic coercive force and to realize a low flying height while traveling, and to provide high CSS durability. As one reason, since by this method the texturing process is employed to provide the rough surface and the under layer and the magnetic layer are formed over it to acquire the same surface texture, the incident angles of sputtered particles differ according to their locations. Further, during the formation of the under layer and the magnetic layer, crystals that are grown are not always desirably formed.

A magnetic recording medium for which a glass substrate is employed as a non-magnetic substrate has drawn attention as a medium with which it is possible to easily provide a high recording density. This is because it has been found that glass has such excellent physical and chemical durability that it is sufficiently hard to cope with a diameter and a thickness that are smaller than those of current hard disks. Also, as a property of glass is that a highly accurate plane surface can be formed comparatively easily, glass more adequately provides for the realization of a high recording density.

In particular, at first, the texturing process was mechanically performed on the surface of glass substrates, as was done for conventional Al substrates, and better results were obtained than those that were obtained with the Al substrates. With this method, however, the smoothness of the glass substrate, which is a characteristic of glass, is not reflected, and it was found that the smoothness of the glass substrate should be fully used to provide a considerable increase in the CSS durability, etc.

To fabricate a magnetic recording medium that employs a glass substrate, a backing film, a magnetic film and a protective film are deposited in named order on a glass substrate, the surface of which has been highly polished. In a process that differs from that employed for a medium using an aluminum substrate, a texturing process is not employed to provide a surface texture for the glass substrate. Instead, a surface texture is provided by the protective film. The backing film and the magnetic film, therefore, are overlaid on an extremely flat, smooth surface. As a result, at the formation of the backing film and the magnetic film, the growth of crystals in these films is easily controlled, and films having desirable properties can comparatively easily be obtained. For a structure using an aluminum substrate, the roughness of the surface of the protective film is formed by indirectly reflecting the roughness of the surface of the substrate through the under layer and the magnetic layer, and thus controlling the roughness is not always easy. On the other hand, for a structure using a glass substrate, the surface of which is highly polished, the surface roughness of the protective film can be determined by its own composition, and controlling the surface roughness is comparatively easy.

SUMMARY OF THE INVENTION

It is one object of the present invention to provide a magnetic recording medium that can easily realize a high magnetic coercive force, travel by a head at a low flying height, and a high CSS durability, and a method for manufacturing such a magnetic recording medium.

To achieve the above object, according to the present invention, a magnetic recording medium comprises:

- a first under layer, formed on a glass plate, a surface of which is highly polished;
- a second under layer, formed, on the first under layer, of a material differing from a material of the first under layer, and having a thickness greater than a thickness of the first under layer;
- a magnetic layer, formed on the second under layer;
- a protective layer, formed on the magnetic layer, on whose surface a texture due to dispersed hard minute particles appears; and
- a lubricant layer, formed on the protective layer.

Further, to achieve the object, according to the present invention, a method fur manufacturing a magnetic recording medium comprises the steps of:

forming a first under layer by sputtering on a glass substrate having a surface highly polished;

forming a second under layer by sputtering with a material differing from a material used for the first under layer, the second under layer thicker than the first under layer;

forming a magnetic layer on the second under layer by the sputtering;

forming a protective layer by applying on the magnetic layer a coating fluid material in which hard minute particles are dispersed, and dispersing the hard minute particles by performing a process, to include heating of a resultant structure, as to provide with the hard minute particles a surface texture on the protective layer; and forming a lubricant layer on the protective layer by coating.

DETAILED DESCRIPTION OF THE PREFERRED EMBODIMENTS

The present inventors conducted various experiments and observations of a magnetic recording medium using a glass substrate to realize a high recording density, and the following facts were acquired.

In order to provide a high magnetic coercive force, a low flying height while traveling, and high CSS durability, it is necessary for a magnetic film and a protective film that affect these functions, or a material, such as a lubricating agent, to be improved. Especially for a magnetic recording medium using a glass plate, it was found that the properties of the above described layers are not always determined by their own composition. Their properties are also affected, to a degree, by their being combined with other layers, by the layer formation condition, and by other conditions. It is conventionally known from various studies that a combination of a under layer and an overlying magnetic layer greatly affects the property of a magnetic layer. In addition to this, it was found that a combination of, for example, a under layer and a protective layer, which is not deposited directly on the under layer but on an intervening magnetic film, affects the mutual properties of the layers and also the property of the magnetic layer. In other words, the individual film layers that are deposited on the glass substrate not only mutually affect directly contacting layers, but also affect indirectly contacting layers. That is, a plurality of layers that are deposited on the glass substrate must be regarded as being organically integrated; changing even one of the layers affects the property of a layer on which it was conventionally considered to have almost no influence, and as a result, the primary property as a magnetic recording medium may be too greatly changed to be disregarded. Further, it was also found that, even when the under layer and the magnetic layer are formed of the same material, the formation of the protective layer using a different material affects the properties of the under layer and the magnetic layer too greatly to be disregarded.

The preferred embodiments of the present invention with the above described background will now be described in detail.

(First Embodiment)

Figure 1:
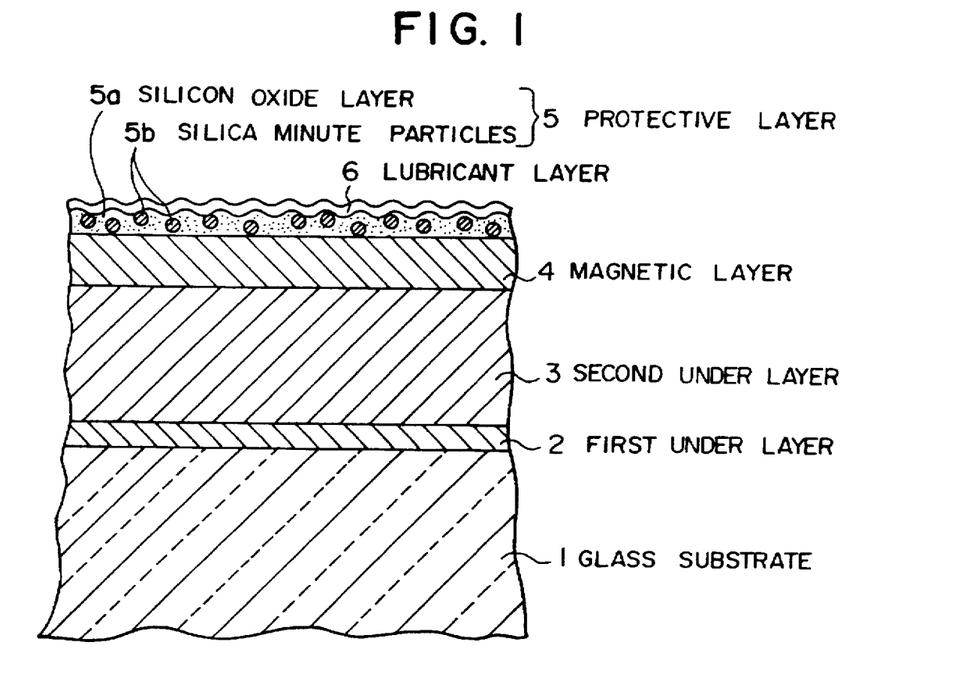
FIG. 1 is a specific cross-sectional view of the structure of a magnetic recording medium according to a first embodiment of the present invention.
Figure 2:
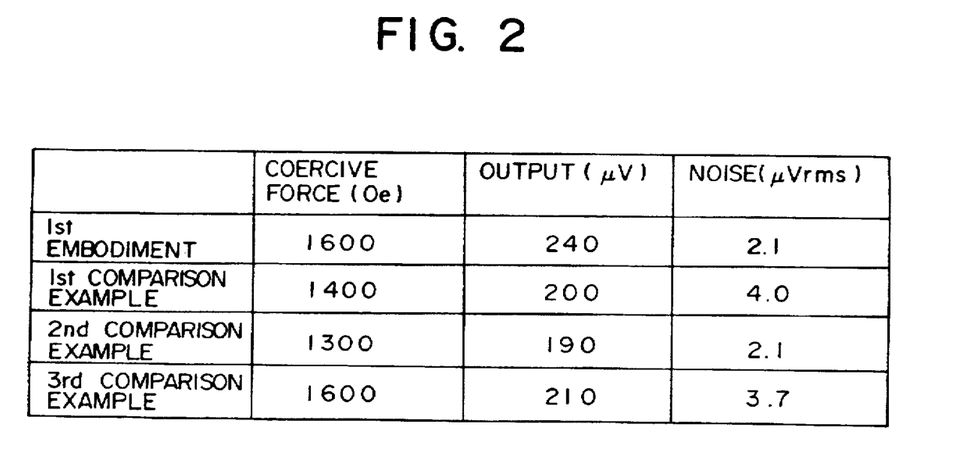
FIG. 2 is a table showing the results obtained by measuring magnetic coercive forces, the recording/reproduction outputs, and the noise of magnetic recording mediums for the first embodiment, and by first through third comparison examples.

FIG. 1 is a specific cross-sectional view of the structure of a magnetic recording medium according to a first embodiment of the present invention. A magnetic recording medium and a manufacturing method therefor according to the first embodiment will now be described while referring to FIG. 1.

As is shown in FIG. 1, the magnetic recording medium in this embodiment is so fabricated as to form on a glass substrate 1 a first under layer 2, a second under layer 3, a magnetic layer 4, a protective layer 5 and a lubricant layer 6 in named order.

The glass substrate 1 is so provided by forming a chemically reinforced glass disk, which has an external diameter of 95 mmφ, a diameter of 25 mmφ for a center hole and a thickness of 0.8 mm, and by highly polishing both surfaces of the disk so that the roughness of the surface is 30 Å at Rmax.

In a treatment tank containing Na ions and/or K ions, ion exchange was conducted on chemically reinforced glass, which contained, as its primary elements, $SiO_2$, at 62 to 75 weight %, $Al_2O_3$ at 5 to 15 weight %, $Li_2$ at 4 to 10%, $Na_2O$ at 4 to 12%, and $ZrO_2$ at 5.5 to 15%; and which had a weight ratio $Na_2/ZrO_2$ of 0.5 to 2.0 and a weight ratio $Al_2O_3/ZrO_2$ of 0.4 to 2.5. The resultant glass was chemically reinforced (see Japanese Unexamined Patent Publication No. Hei 5-32431 for the details to provide the chemically reinforced glass on which the glass substrate 1 was formed.

The first under layer 2 is an Al thin film having a thickness of approximately 50 angstroms (Å).

A property of the material used for the first under layer 2 is that it promotes the crystalline growth of the second under layer 3, which is formed on the first under layer 2 to support the crystalline growth of the magnetic layer 4 that is deposited on the second under layer 3; and another property is that it relieves internal stress resulting from a difference in thermal expansion between the second under layer 3 and the glass substrate 1.

The second under layer 3 is Cr film having a thickness of approximately 2000 angstroms.

The magnetic layer 4 is CoNiCr film having a thickness of approximately 500 angstroms. The CoNiCr film has a constituent composition ratio of Co:Ni:Cr=65:25:10.

In the protective layer 5, minute silica ($SiO_2$) particles 5b are dispersed in a silicon oxide (polysilicate) film 5a on the surface of which the texture is provided by the minute silica particles. The thickness of the silicon oxide film 5a in which minute silica particles 5b are not present is about 100 angstroms. The average diameter of the silica particles 5b is about 120 angstroms. The average particle diameter of the silica particles 5b is an average value obtained by measuring the diameters of a silica particle group that included spherical and non-spherical silica particles.

A lubricating agent (e.g., AM2001 produced by Montedison, Co., Ltd.), that consists of perfluoropolyether, is coated on the protective layer 5 by immersion to form the lubricant layer 6 having a thickness of about 20 angstroms.

A method for fabricating a magnetic recording medium in this embodiment will now be described.

First, chemically reinforced glass plate is cut to obtain a disk having an external diameter of 95 mmφ, a center hole having a diameter of 25 mmφ, and a thickness of 0.8 mm. Both surfaces of the disk are highly polished to acquire the glass substrate 1 whose surface roughness is about 30 angstroms at Rmax.

Then, the glass plate 1 is washed, and on the principle surface of the glass plate 1, the first under layer 2 is formed by sputtering an Al film having a thickness of about 40 angstroms using an Al target and a Ar gas.

Following this, on the first under layer 2, the second under layer 3 is formed by sputtering a Cr film having a thickness of approximately 2000 angstroms using a Cr target and an Ar gas.

Next, on the second under layer 3, the magnetic layer 4 is formed by sputtering a CoNiCr film having a thickness of about 500 angstroms using a CoNiCr target and an Ar gas.

Then, spin coating with a solution comprising a mixture of tetra ethoxy-silane ($Si(OC_2H_5)_4$) which is an organic silicon compound, minute silica particles which have a diameter of about 100 angstroms as measured using a particle distribution device Coulter counter N4 produced by Coulter Counter Co., Ltd., water, and isopropyl alcohol at a ratio of 10:0.3:3:500, is performed to form a thin film on the surface of the magnetic layer 4. The thin film, which is formed with the organic silicon compound solution that includes the minute silica particles, is heated at about 28° C. for two hours, and the protective layer 5 is fabricated in which the minute silica particles 5b are dispersed in the silicon oxide (polysilicate). In this layer, the thickness of a portion where no silica particles 6a are present is approximately 100 angstroms.

A lubricating agent consisting of perfluoropolyether (e.g., AM 2001 produced by Montedison, Co., Ltd.) is coated on the protective layer 5, by immersion, to form the lubricant layer 6 which has a thickness of about 20 angstroms. Then, protrusions are removed from the surface by using a vanishing head, and finally a magnetic recording medium according to this embodiment is acquired.

The roughness of the surface of the thus acquired magnetic recording medium was measured by using a Talystep produced by Rank Taylor Hobson Kabushiki Kaisha, and the maximum height (Rmax) was 150 angstroms.

The magnetic recording medium thus produced was not only passed through the glide test for 500 angstroms but was also passed through the glide test for 300 angstroms.

A contact start stop test (CSS test) was conducted by using a magnetic head that has an $Al_2O_3$-TiC sintered structure as a slider. A coefficient of the static friction after repeating the test 100,000 times was 0.5 or lower, and abrasion resistance was excellent.

When the coercive force of the magnetic recording medium was measured, it was 1600 oersteds, which is excellent.

A thin film head that has a head flying height of 0.055 μm was employed, and the recording and reproduction output at a relative speed between the head and the disk of 6 m/s and with a linear recording density of 70 dfci (linear recording density of 70000 bits per inch) was measured. The acquired output value was very high, 240 μV.

In addition, with a carrier frequency of 8.5 MHz and a measurement band of 15 MHz, the noise spectrum at the time of signal recording and reproduction was measured by a spectrum analyzer. As for the thin film head employed for this measurement, the number of its coil turns was 50, the track width was 6 μm, and the magnetic head gap length was 0.25 μm. As a result, the measured noise had a very small value, 2.1 μVrms.

Further, the magnetic characteristic that was measured under the above condition was also preferable, and with D50, recording at a high density of 80 KFPI (kilobits/inch) was possible.

(First Comparison Example)

As a comparison with the first embodiment, a magnetic recording medium for a first comparison example was fabricated by the same manufacturing method, and except for the first under layer 2 not being formed, had the same structure as that of the first embodiment. The characteristics of the thus obtained magnetic recording medium were measured by the same measurement methods that were used for the first embodiment. The coercive force was 1400 oersteds, the recording and reproduction output was 200 μV, and the noise was 4.0 μVrms, all of which were inferior to those acquired in the first embodiment.

(Second Comparison Example)

As an additional comparison, a magnetic recording medium for a second comparison example was fabricated by the same manufacturing method, and had the same structure as that of the first embodiment, including the first under layer. The characteristics of the thus obtained magnetic recording medium were measured by the same measurement methods that were used for the first embodiment. The coercive force was 1300 oersteds, the recording and reproduction output was 190 μV, and the noise was 2.1 μVrms. Although the noise characteristic is the same as that in the first embodiment, the coercive force and the recording and reproduction output were inferior to those acquired in the first embodiment.

(Third Comparison Example)

As a further comparison, a magnetic recording medium for a third comparison example was fabricated by the same manufacturing method, and with the exception that the thickness of the first under layer 2 was 150 angstroms, had the same structure as that of the first embodiment. The characteristics Of the thus obtained magnetic recording medium were measured. The coercive force was 1600 oersteds, the recording and reproduction output was 210 µV, and the noise was 3.7 µVrms. Although the coercive force was the same as that in the first embodiment, the recording and reproduction output, and the noise characteristic were inferior to those acquired in the first embodiment.

Figure 3:
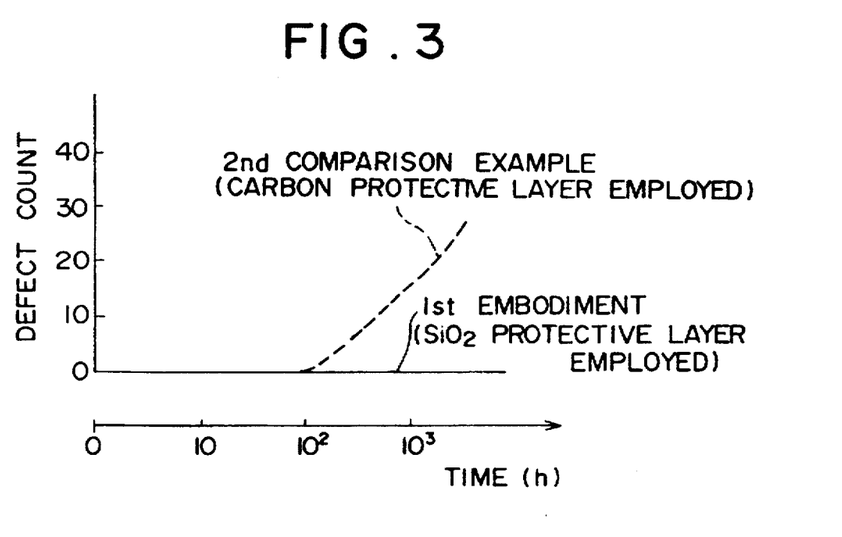
FIG. 3 is a graph showing the results obtained for the environment durability of the first embodiment and the second comparison example.

The magnetic recording medium in the first embodiment and the magnetic recording medium in the second comparison example were stored at a high temperature of 80° C. and in an atmosphere having a with high humidity of 85%. The number of defects that occurred as time elapsed was measured for each medium by using a measuring device (an RC 560 media certifier produced by Hitachi Electronics Engineering Co., Ltd.). The results are shown in the graph in FIG. 3. As is apparent from the graph, no defects occurred for the magnetic recording medium in this embodiment, even after it had been stored at a high temperature and a high humidity for a long time, while defects occurred for the other magnetic recording medium that was stored under the same conditions, and the number of defects drastically increased as time passed.

(Second and Third Embodiments)

Figure 4:
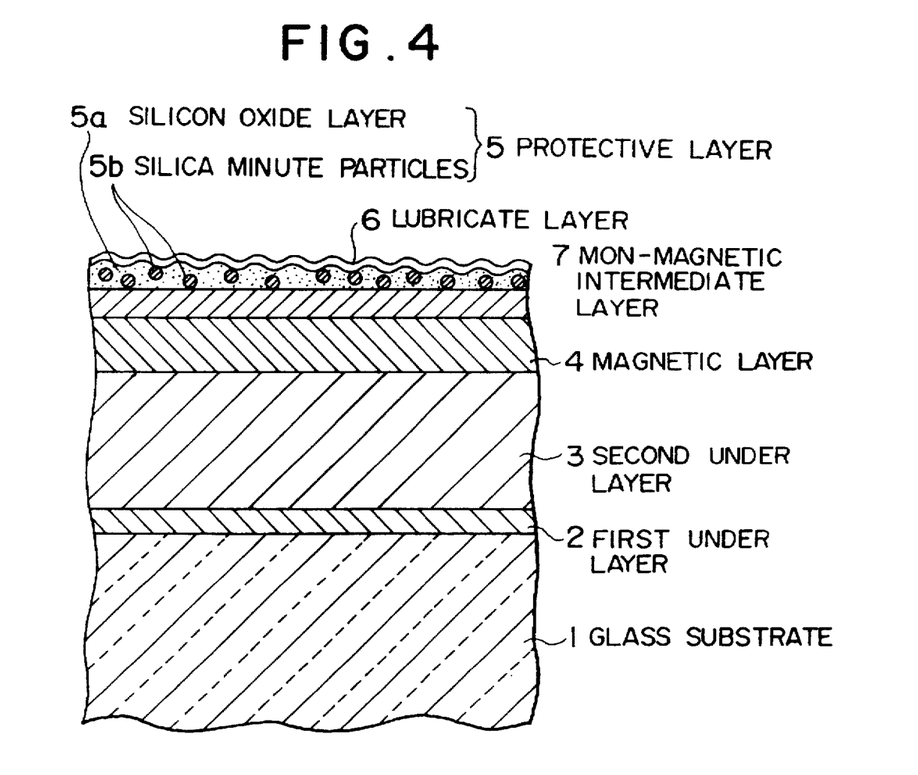
FIG. 4 is a specific cross sectional view of the structure of a magnetic recording medium according to a second embodiment of the present invention.

FIG. 4 is a specific cross-sectional view of the structure of a magnetic recording medium according to a second embodiment of the present invention. As is shown in FIG. 4, the structure in this embodiment is the same as that in the first embodiment, except in that a non-magnetic intermediate layer 7 is deposited between the magnetic layer 4 and the protective layer 5 in the first embodiment. The same reference numerals as are used in FIG. 1 are also used in FIG. 4 to denote corresponding or identical components.

A magnetic recording medium according to a third embodiment is the same as that in the second embodiment, except in that the second under layer 3 (a single-layer structure of Cr film of 2000 angstroms) used in the second embodiment is formed of a double layers of Cr film of 1000 angstroms.

The intermediate layer 7 in the second and the third embodiment is Cr film having a thickness of 50 angstroms. The intermediate layer 7 is deposited on the magnetic layer 4 by sputtering using a Cr target and an Ar gas.

The characteristics of the magnetic recording medium in the second embodiment with the intermediate layer 7 were measured by using the same measurement methods that were used for the first embodiment, and excellent results were obtained. The coercive force was 1700 oersteds, and the maximum recording density was 90 Kfci with D50. As for the CSS characteristics, the coefficient of static friction was 0.4 or lower, and the results acquired by conducting the glide test were the same as those for the first embodiment. As for the magnetic recording medium in the third embodiment, the coercive force was 1750 oersteds, and excellent magnetic characteristics were obtained; the reproduction output was 250 µV; and the medium noise was 2.2 µVrms, and the acquired maximum recording density and the CSS characteristics were the same as those obtained for the first and the second embodiments.

It was found that by the provision of the intermediate layer 7, not only would the film quality of the protective layer 5 be improved by using an adequately high temperature during the heating process for forming the protective layer 5, but also the coercive force of the magnetic layer 4 could be greatly enhanced.

In the process for fabricating a magnetic recording medium in the above embodiments, only the temperature for heating the protective layer was changed, and five different magnetic recording media were provided after being heated respectively at the following temperatures: room temperature, 150° C., 200° C., 250° C. and 300° C.

Then, as comparison examples for the first comparison, five different magnetic recording media were fabricated in the same manner, except that the intermediate layers 7 were not formed. In addition, for the second comparison, five different magnetic recording media were fabricated as comparison examples in the same manner, except that the intermediate layers 7 were not formed, and $SiO_2$ was used instead of carbon (C) to form the protective layers 5.

And then, for the third comparison, five different magnetic recording media were fabricated as comparison examples in the same manner, except that while the intermediate layers 7 were formed, the first under layers 2 were not formed. As for the magnetic recording mediums for the third comparison, the coercive force was 1450 oersteds, the reproduction output was 200 µV, and the noise was 3.9 µVrms.

Figure 5:
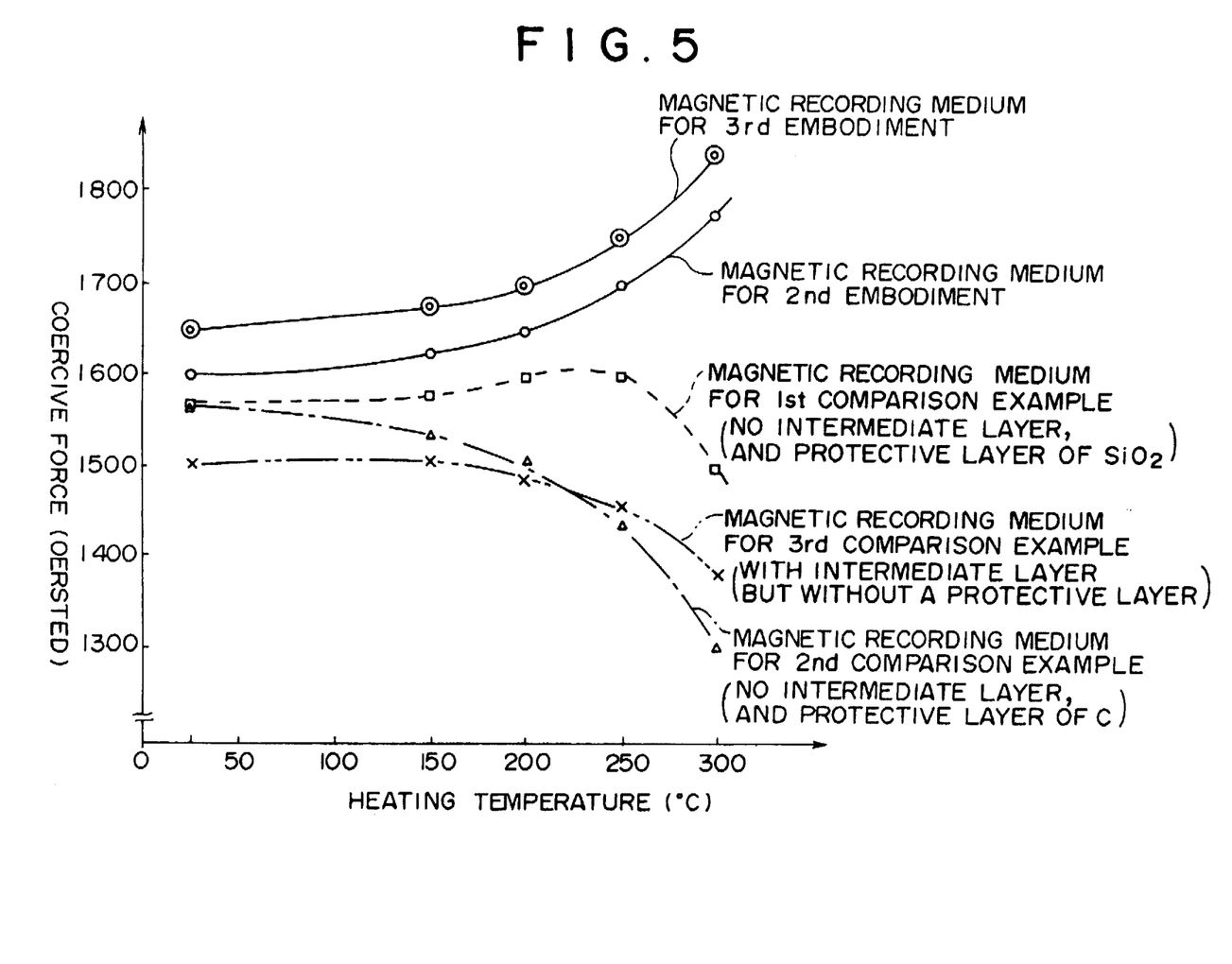
FIG. 5 is a graph showing the relationship between a temperature for heating and a magnetic coercive force.

The results acquired by comparisons of the coercive forces of the magnetic recording media are shown in the graph in FIG. 5. In the graph in FIG. 5, the vertical axis indicates the coercive force (unit: oersted) and the horizontal axis indicates a heating temperature (unit: °C.). The plotted lines with the circular marks represents the magnetic recording medium for the second and third embodiments. The plotted line with the square marks represents the magnetic recording medium for the first comparison; and the plotted line with the triangular marks represents the magnetic recording medium for the second comparison.

As is apparent from this graph, the coercive force of the magnetic recording medium in each embodiment is improved as the heating temperature is increased to, for example, 300° C. On the other hand, the coercive force of the magnetic recording medium for each comparison is reduced as the heating temperature is increased.

(Fourth through Fourteenth Embodiment)

Figure 6:
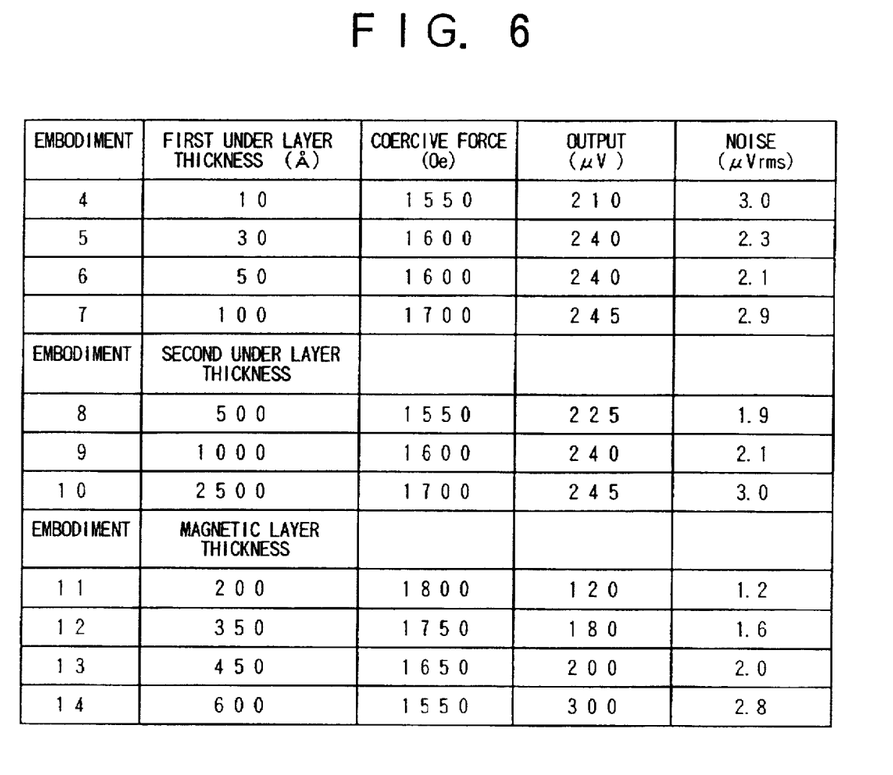
FIG. 6 is a table showing the results obtained by the measurement of magnetic recording media characteristics according to fourth through fourteenth embodiments.

The characteristics of magnetic recording media, which have the same layer structure as that in the first embodiment but have a different thickness for each layer, are shown in the table in FIG. 6 for the fourth through the fourteenth embodiment.

(Fifteenth through Eighteenth Embodiment)

Figure 7:
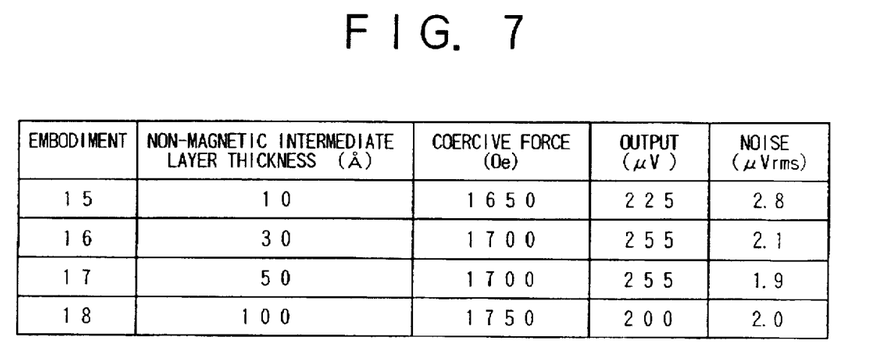
FIG. 7 is a table showing the results obtained by the measurement of magnetic recording media characteristics according to fifteenth through eighteenth embodiments.

The characteristics of magnetic recording media, which have the same layer structure as that in the second embodiment but have different thicknesses for the non-magnetic intermediate layer, are shown in the table in FIG. 7 for the fifteenth through the eighteenth embodiment.

(Nineteenth through Twenty-second Embodiment)

Figure 8:
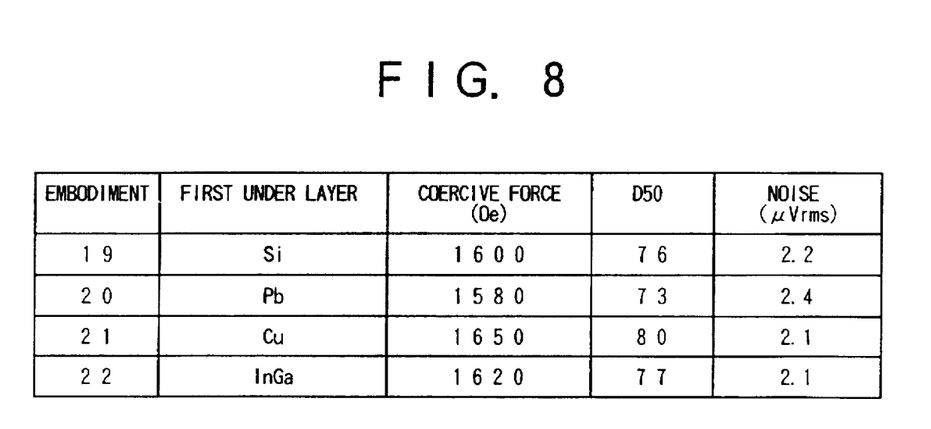
FIG. 8 is a table showing the results obtained by the measurement of magnetic recording media characteristics according to nineteenth through twenty-second embodiments.

The characteristics of magnetic recording media, which have the same layer structure as that in the first embodiment for which different materials are used for the first under layers 2, are shown in the table in FIG. 8 for the nineteenth through the twenty-second embodiment.

(Twenty-third through Twenty-sixth Embodiment)

Figure 9:
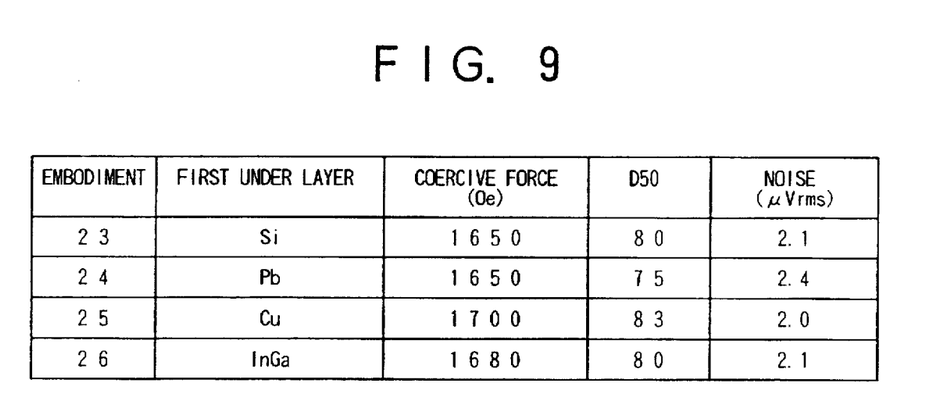
FIG. 9 is a table showing the results obtained by the measurement of magnetic recording media characteristics according to twenty-third through twenty-sixth embodiments.

The characteristics of magnetic recording media, which have the sSame layer structure as that in the second embodiment but for which different materials are used for the first under layers 2, are shown in the table in FIG. 9 for the twenty-third through the twenty-sixth embodiment.

(Twenty-seventh through Thirty-third Embodiment)

Figure 10:
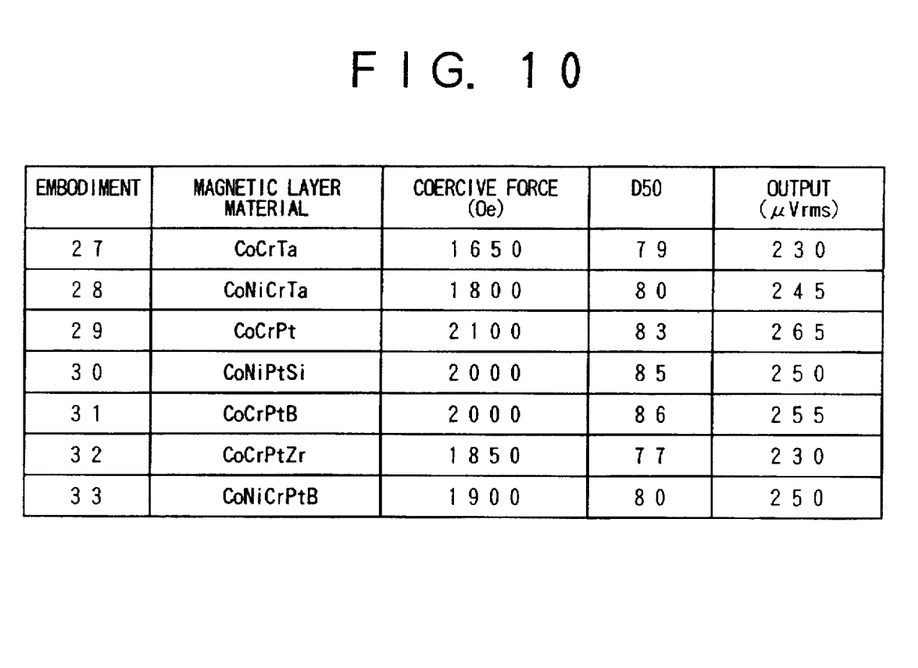
FIG. 10 is a table showing the results obtained by the measurement of magnetic recording media characteristics according to twenty-seventh through thirty-third embodiments.

The characteristics of magnetic recording media, which have the same layer structure as that in the first embodiment for which different materials are used for the magnetic layers 4, are shown in the table in FIG. 10 for the twenty-seventh through the thirty-third embodiment.

(Thirty-fourth through Fortieth Embodiments)

Figure 11:
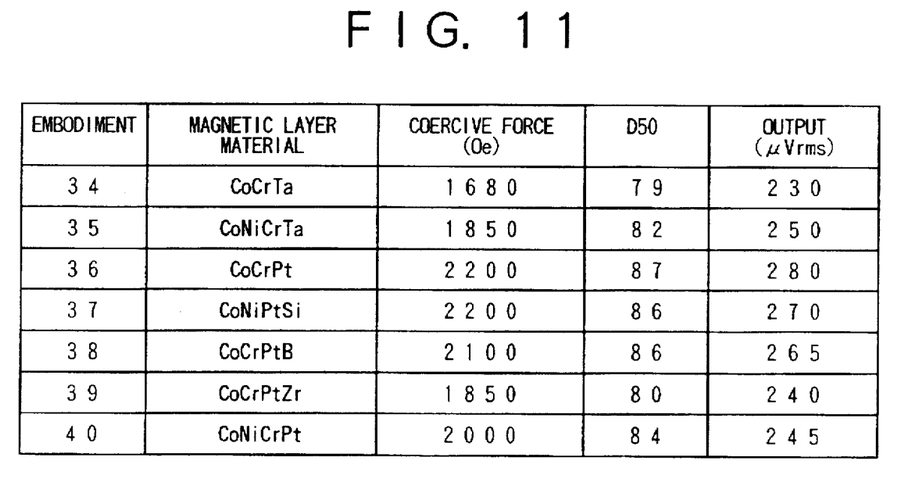
FIG. 11 is a table showing the results obtained by the measurement of magnetic recording media characteristics according to thirty-fourth through fortieth embodiments.

The characteristics of magnetic recording media, which have the same layer structure as that in the second embodiment but for which different materials are used for the magnetic layers 4, are shown in the table in FIG. 11 for the thirty-fourth through the fortieth embodiment.

(Forty-first through Forty-sixth Embodiment)

Figure 12:
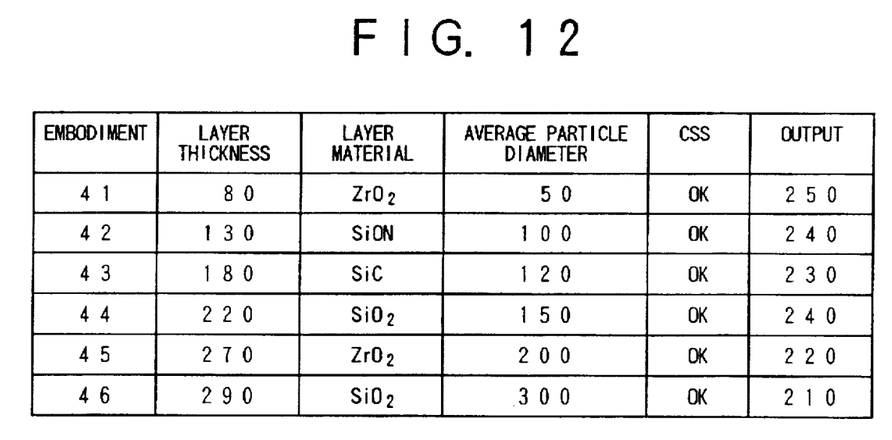
FIG. 12 is a table showing the results obtained by the measurement of magnetic recording media characteristics according to forty-first through forty-sixth embodiments.

The characteristics of magnetic recording media, which have the same layer structure as that in the first embodiment but for which the thicknesses and the materials of the films 5a of the protective layers 5 and the average diameters of the minute silica particles are different, are shown in the table in FIG. 12 for the forty-first through the forty-sixth embodiment. In FIG. 12, the CSS characteristics were assumed to be acceptable if a coefficient of the static friction, after the CSS test had been repeated 100,000 times, was 0.5 or less.

(Forty-seventh through Fifty-second Embodiment)

Figure 13:
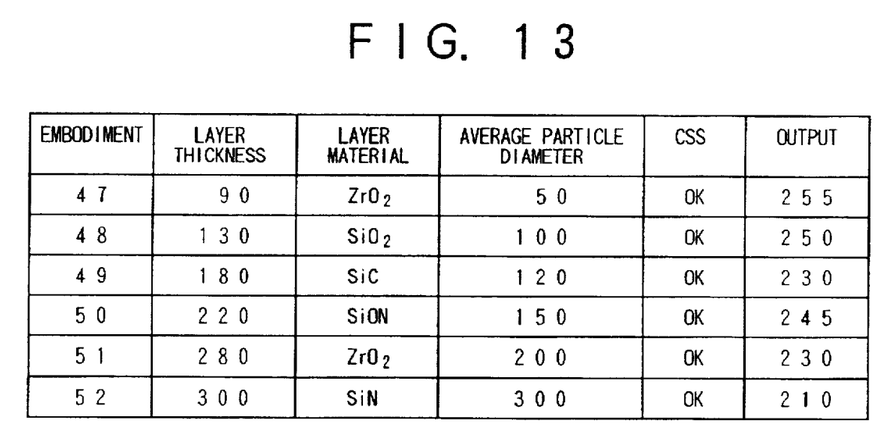
FIG. 13 is a table showing the results obtained by the measurement of magnetic recording media characteristics according to forty-seventh through fifty-second embodiments.

The characteristics of magnetic recording media, which have the same layer structure as that in the second embodiment but for which the thicknesses and the materials of the films 5a of the protective layers 5 and the average diameters of minute silica particles are different, are shown in the table in FIG. 13 for the forty-seventh through the fifty-second embodiment.

Although the present invention has been described according to the above embodiments, the following modifications are also acceptable.

(1) Although, in the above embodiments, chemically reinforced glass is employed as a substrate, soda lime glass, borosilicate glass, aluminosilicate glass, aluminoborosilicate glass, quartz glass, or ceramics can be employed instead. These glasses can readily attain the surface roughness Rmax equal to or less than 100 angstroms by polishing. The outer diameter of the substrate may be reduced, and the thickness may be decreased.

(2) Although the second under layer in the above embodiments is made of Cr film, non-magnetic materials, such as TiO, Mo, Ti, Ta, A, Zr, Cu, A, Zn, in or Sn, can be used instead of Cr as the material for the second under layer.

(3) Besides the above described material for the magnetic layer, a Co alloy, such as CoNiPt, CoNiZr, CoCrPt, CoPt, CoNiPi or CoP, or a magnetic material, such as $Fe_2O_3$, can be used.

(4) While a non-magnetic intermediate layer composed of Cr film is employed in the second embodiment, the non-magnetic intermediate layer may be formed of a non-magnetic material, such as MOr Ti, Ta, W, Si or Ge, or may be formed of a non-magnetic thin film of Ti, W, CrMo, or their oxides, nitrides, or carbides. Further, for the non-magnetic intermediate layer, two layers or more of the above non-magnetic film, may be deposited.

(5) In the first embodiment, tetra ethoxy-silane, which is an organic silicon compound, is employed as the material for forming the protective layer 5: however, its partially or fully hydrolyzed material may be used. Further, so long as silicon oxide is formed by a so-called sol-gel method, another silicon alkoxide or its partially or fully hydrolyzed material can be used. As an example material, a tetra alkoxy-silane, such as tetra methoxy-silane, tetra-n-propoxy-silane, tetra-1-propoxy-silane, tetra-n-putopoxy-silane, tetra-sec-putopoxy-silane, or tetra-tert-putopoxy-silane; or silicon alkoxide, such as monoalkyl trialkoxy silane, dialkyl dialkoxy silane, or trialkyl monnalkoxy silane, that is obtained by replacing one to three alkoxy groups of the tetra alkoxy-silane with alkyl groups; or their partially or fully hydrolyzed materials can be employed.

Although, in the first embodiment, the average particle diameter of the minute silica particles is 100 angstroms, preferably, the average particle diameter falls within a range of from 50 to 300 angstroms, and particles having two different average diameters that are within this range may be mined. So long as the average diameter of the particles falls within the range of from 50 to 300 angstroms, it is easy for the surface roughness (Rmax) of the magnetic recording medium to be set at a desired 50 to 300 angstroms. Especially for a magnetic recording medium for contact recording, it is preferable that its average particle diameter fall within the range of 50 to 200 angstroms.

A desired value for the surface roughness (Rmax) of the magnetic recording medium is set at 50 to 300 angstroms because when the value is less than 50 angstroms, sticking of the magnetic head can not be prevented, and when the value exceeds 300 angstroms, the operation of the magnetic head across the recording medium is unstable, head crashes tend to occur, and the magnetic recording and reproduction characteristics are also degraded. Particularly during contact recording, since if the distance between the magnetic layer and the head is changed as time elapses, i.e., if vibration occurs, the magnetic characteristic will be adversely affected, and thus it is important that the value of the surface roughness does not exceed 300 angstroms.

In the first embodiment, the thickness in the portion of the protective layer wherein silica particles are not present is 100 angstroms. It is preferable that the thickness of this area fall within the range of from 20 to 200 angstroms. If the thickness is less than 20 angstroms, the inorganic oxide film is too thin, and accordingly, the coercive force for the hard minute particles is small, so that the CSS durability is degraded and the layer cannot serve as a protective layer and causes the deterioration of the magnetic layer. If the thickness of the protective layer exceeds 200 angstroms, the problem of cross spacing occurs. This range is also preferable so that the surface roughness (Rmax) of the magnetic recording medium is set at 50 to 300 angstroms by using the hard minute particles having an average diameter of 50 to 200 angstroms.

(6) Although perfluoropolyether is employed as a lubricant in the above embodiments, a fluid lubricating agent of fluorocarbon or a lubricating agent consisting of sulfonic acid alkali metal salt can be used instead. It is desirable that the thickness of the lubricant layer be 10 to 30 angstroms, because if it is less than 10 angstroms, abrasion resistance can not be sufficiently enhanced. If the layer thickness exceeds 30 angstroms, abrasion resistance does not increase, and sticking of the magnetic head results.

As is described in the above embodiments, since the thus described combination of the protective layer and the under layer is employed, high coercive force, high output, reduction of noise, traveling at a low flying height, and high CSS durability can be easily provided.

This is because, since the protective layer is formed of a material in which hard minute particles, silica particles, are dispersed and on the surface of which texture provided by the hard particles appears, the appropriate surface roughness can be easily attained for the protective layer.

In the above embodiments, the under layer includes the first under layer 2 that is formed on and in contact with the glass substrate 1, and the second under layer 3 that is formed on the first under layer 2, by using a material that is different from that of the first under layer 2 and that is thicker than the first under layer 2. Properties of the material for the first under layer 2 are that it supports the crystalline growth of the second under layer 3, which is deposited on the first under layer 2, in order to promote the crystalline growth of the magnetic layer 4, which is deposited on the second under layer 3, and that it reduces the internal stress due to thermal expansion between the second under layer 3 and the glass substrate 1. Since the first under layer 2 is formed of such a material, the crystalline growth of each layer can preferably be performed when the second under layer 3 and the magnetic layer 4 are formed, and thermal treatment can be satisfactory conducted for the protective layer 5, which is formed on the magnetic layer 4, to provide a desirable film quality. At the same time, the second under layer 3, the overlying magnetic layer 4, and the protective layer 5 are prevented from being affected by the internal stress that is caused by thermal expansion between the second under layer 3 and the glass substrate 1 during the thermal treatment. Also, a harmful substance from the glass substrate 1 is prevented from entering the other layers. As a result, the magnetic characteristics of the magnetic recording medium and the CSS durability during travel at a low flying height can be drastically enhanced. These are assumed to be special effects that are acquired by using the above described combination of the under layers 2 and 3 and the protective layer 5. In other words, even if the under layers 2 and 3 and the magnetic layer 4 are formed of the same material, so long as the protective layer 5 is a different material, for example, a carbon protective layer in which no hard particles are dispersed, it has been confirmed that the above described effects can not be obtained.

We claim:

1. A magnetic recording medium comprising:
   a first under layer, formed on a glass plate having a surface which is precisely polished with a Rmax of less than 100 Å, said first layer including a material having as primary components at least one of Al, Si, Pb, Cu, In, Ti and Ga;
   a second under layer, formed on said first under layer, said second layer including a material different than said material of said first under layer, and having a thickness greater than a thickness of said first under layer;
   a magnetic layer, formed on said second under layer;
   a protective layer, formed on said magnetic layer, on whose surface a texture due to dispersed hard minute particles appears; and
   a lubricant layer, formed on said protective layer,
   wherein said material of said first under layer is able to promote a crystalline growth of said second under layer so as to support a crystalline growth of said magnetic layer, and relieve internal stress resulting from a difference in thermal expansion between said second under layer and said glass substrate.

2. A magnetic recording medium according to claim 1, wherein said first under layer has a thickness of 10 to 100 Å.

3. A magnetic recording medium according to claim 1, wherein said or said second under layer is a Cr-Y film material wherein Y is at least one of Mo, Zr, B, W, Ta, V and Si.

4. A magnetic recording medium according to claim 1, wherein said under layer is formed with at least two film layers.

5. A magnetic recording medium according to claim 1, wherein said second under layer has a thickness of 500 to 2500 Å.

6. A magnetic recording medium according to claim 1, wherein said material for said magnetic layer is a Co-X magnetic material, wherein X is at lest one of Ni, Cr, Ta, Pt, Zr, Si and B.

7. A magnetic recording medium according to claim 1, wherein said magnetic layer has a thickness of 200 to 600 Å.

8. A magnetic recording medium according to claim 1, wherein a coating solution that contains an organic agent and hard minute silica particles at a predetermined ratio is applied to deposit a thin film, and a thermal treatment is performed on said thin film, to form said protective layer.

9. A magnetic recording medium according to claim 8, wherein an average diameter of said hard minute silica particles is 50 to 300 Å.

10. A magnetic recording medium according to claim 8, wherein said protective layer has an area in which said hard silica particles are not present, and a thickness of said area is 20 to 200 Å.

11. A magnetic recording medium according to claim 1, wherein a non-magnetic intermediate layer is formed between said magnetic layer and said protective layer.

12. A magnetic recording medium according to claim 11, wherein said non-magnetic magnetic intermediate layer has a thickness of 10 to 100 Å.

13. A method for manufacturing a magnetic recording medium comprising the steps of:
   forming a first under layer by sputtering on a glass substrate having a precisely published surface with a Rmax of less than 100 Å;
   forming a second under layer by sputtering with a material different than a material used for said first under layer, said second under layer being thicker than said first under layer;
   forming a magnetic layer on said second under layer by sputtering;
   forming a protective layer by applying on said magnetic layer a coating fluid material in which hard minute particles are dispersed, and dispersing said hard minute particles by performing a process, including heating of a resultant structure, to provide by said hard minute particles a surface texture on said protective layer; and
   coating a lubricant layer on said protective layer
   wherein said material of said first under layer is able to promote a crystalline growth of said second under layer so as to support a crystalline growth of said magnetic layer, and relieve internal stress resulting from a difference in thermal expansion between said second under layer and said glass substrate.

14. A method for manufacturing a magnetic recording medium according to claim 13, wherein a coating solution that contains an organic agent and hard minute silica particles at a predetermined ratio is applied to deposit a thin film, and a thermal treatment is performed on said thin film, to form said protective layer.

* * * * *